Figure 1:
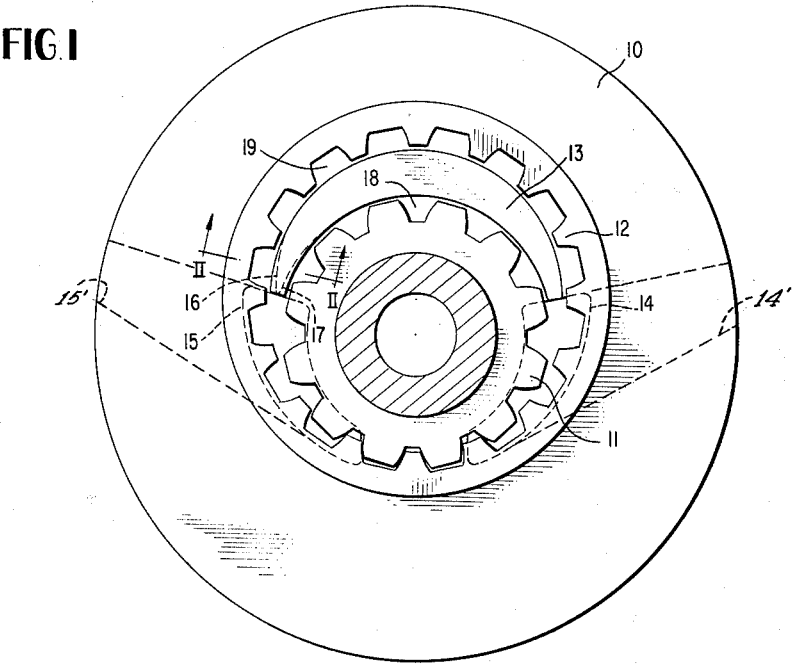

Sept. 7, 1965   G. ELTZE   3,204,564
GEAR PUMP
Filed April 1, 1963

INVENTOR.
GEORG ELTZE
BY Dicke & Craig
ATTORNEYS

United States Patent Office 3,204,564
Patented Sept. 7, 1965

3,204,564
GEAR PUMP
Georg Eltze, Stuttgart-Riedenberg, Germany, assignor to Daimler-Benz Aktiengesellschaft, Stuttgart-Unterturkheim, Germany
Filed Apr. 1, 1963, Ser. No. 269,264
Claims priority, application Germany, Apr. 6, 1962, D 38,597
2 Claims. (Cl. 103—126)

The present invention relates to a gear pump, especially for use as a pressure producer in combination with automatically-shifted motor vehicle change-speed gears, provided with at least one externally toothed gear wheel and with equalization channels between the pressure space of the pump and the tooth gaps in the gear wheels moving in the direction toward the pressure space whereby each equalization channel is in continuous communication over the entire length thereof with the tooth gaps passing the same.

With a gear pump of this type which is known in the prior art and having externally toothed gear wheels, grooves are arranged in the housing parts abutting against the end faces of the gear wheels and serving simultaneously as bearing which grooves have the same width over the entire length thereof. However, these prior art pumps are concerned with influencing the bearing pressures at the pump in a predetermined manner.

In contradistinction thereto, the present invention is concerned with an entirely different problem. It has been discovered that the aforementioned gear pumps operate above a predetermined rotational speed in an extremely loud and noisy manner. This may be attributed to the fact that the tooth gaps are not filled completely with oil or with the supply medium at high rotational or circumferential speeds and during the transition or passage into the pressure space are then filled with oil in an instantaneous manner from the latter. A banging or detonating noise is produced thereby which adds up to a howling tone corresponding to the frequency of the tooth gaps and rotational speed. The present invention aims at an elimination of the aforementioned drawback.

The present invention solves the problem with the gear pumps of the type described hereinabove by providing an equalization channel which, starting from the pressure space of the pump, becomes narrower in a continuous manner and by coordinating at least one such channel to each externally toothed gear wheel.

Apart from the fact that the aforementioned prior art arrangement is concerned from its inception with the solution of an entirely different problem, it also would be unsuitable as solution for the problem underlying the present invention. This is so as the use of the known relatively narrow groove would not permit a slow gradual filling of the tooth gaps and therewith would not permit a continual pressure increase without any sudden rise or increase. Additionally, the prior art groove is arranged at a place corresponding approximately to the center of the tooth gaps so that the gaps cannot be filled from the base or root thereof. The present invention alleviates this shortcoming.

Admittedly, the problem of noise generation with gear pumps is not new. Known in the prior art as solution is, for example, still another gear pump with an externally toothed and an internally toothed gear wheel in which a groove is arranged within the segment disposed between both gear wheels which groove starts from the pressure space but has no connection leading to the tooth gaps. This prior art groove extends up to approximately half the aforementioned segment. At that point, this groove passes over into a transverse groove which in turn is in communication externally as well as internally with the passing tooth gaps. Such prior art arrangement, however, does not result in the desired improvement since with the groove arrangement thereof a sudden instantaneous filling of the tooth gaps still takes place as heretofore.

With a gear pump having externally and internally toothed gear wheels the present invention proposes to arrange on the inner side of the stationary segment disposed between both gear wheels and facing the externally toothed gear wheel, a groove starting from the pressure space of which the depth decreases continuously from the pressure space. However, it is also possible to arrange on the external side of the aforementioned segment facing the internally toothed gear such a groove. With a gear pump having two externally toothed gear wheels there may also be arranged on the inner side of the pump housing facing the gear wheel circumference a groove that becomes more shallow from the pressure space in a continuous manner.

It is appropriate in all cases to arrange the groove or grooves at a place within the housing or segment corresponding to the center plane of the gear wheel or gear wheels perpendicular to the axis. However, it is also feasible within the present invention to coordinate the grooves to the end faces of the gears. This may be realized most appropriately in such a manner that grooves are arranged at one side or both sides within the housing or cover which grooves, starting from the pressure space, become ever smaller or shallower in a continuous manner. These grooves are disposed at such places within the housing or the cover along which pass the root or dedendum portions of the teeth.

Accordingly, it is an object of the present invention to provide a gear pump that effectively eliminates in a simple and reliable manner the shortcomings and drawbacks encountered with the prior art constructions.

It is another object of the present invention to provide a gear pump which eliminates the objectionable noises that have been unavoidable heretofore with such pumps at high speeds.

Still a further object of the present invention resides in a gear pump construction in which sufficient filling with pressure medium is assured in the tooth gaps during those phases of operation that determine the absence of the objectionable noises.

Figure 2:
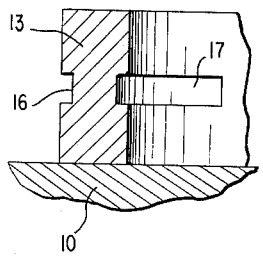
Figure 3:
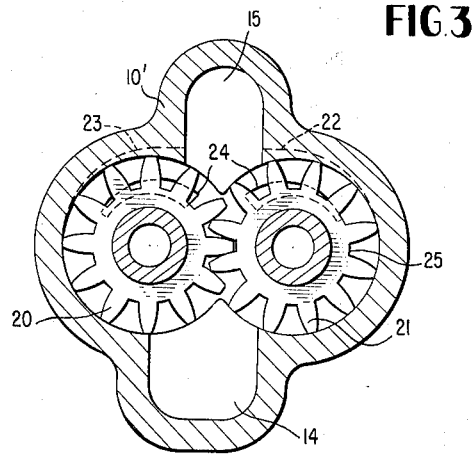

These and other objects, features and advantages of the present invention will become more obvious from the following description when taken in connection with the accompanying drawing which shows, for purposes of illustration only, two embodiments in accordance with the present invention and wherein:

FIGURE 1 is an elevational view, partly in cross section, of a gear pump provided with an externally and an internally toothed gear wheel in accordance with the present invention, with the cover thereof removed for sake of clarity, FIGURE 2 is a partial cross sectional view, on an enlarged scale, taken along line II—II of FIGURE 1, and FIGURE 3 is a cross sectional view through a gear pump with two externally toothed gear wheels in accordance with the present invention.

Referring now to the drawing wherein like reference numerals are used throughout the various views to designate like parts, and more particularly to FIGURES 1 and 2, reference numeral 10 indicates therein the housing of a gear pump. Since the housing 10 is of conventional construction, details thereof are omitted herein. An externally toothed gear wheel 11 and an internally toothed gear wheel 12 is arranged within a pumping chamber in the housing 10. The gears 11 and 12 mesh with each other in a known manner. The externally toothed gear wheel 11 serves as driving gear. The segment 13 is disposed between the two gear wheels 11 and 12. Both gear wheels 11 and 12 normally rotate in the counterclockwise direction so that the suction space 14 is disposed on the right side in communication with inlet part 14' and the pressure space 15 is disposed on the left side of the gear pump in communication with outlet port 15' schematically illustrated in FIGURE 1. The operation of the pump and the basic construction thereof is known in principle so that a further detailed description thereof is dispensed with herein.

Two grooves 16 and 17 are arranged within the segment 13 approximately at half the height thereof as shown particularly well in FIGURE 2. These grooves 16 and 17 start from the pressure space 15 and comprise approximately one-third of the entire length of the segment 13. The depth of the grooves 16 and 17 decreases in a continuous manner from the pressure space 15. However, it is also within the purview of the present invention, to provide only the groove 17 and to omit the groove 16 or vice versa.

During operation of the pump the tooth gaps 18 of the externally toothed gear wheel 11 are filled from the pressure space 15 by the groove 17. Since the depth of the groove 17 increases continuously, as viewed in the direction of rotation of the pump, this filling takes place slowly and without any sudden pressure increase. The same effect occurs when the tooth gaps 19 of the internally toothed gear wheel 12 are filled by way of the groove 16. The disturbing and annoying noise development is avoided in this manner whereby the filling of the smaller externally toothed gear appears to be more important since partial fillings occur at first at this gear wheel by reason of the centrifugal force.

According to the embodiment of FIGURE 3, two externally toothed gear wheels 20 and 21 are arranged within the housing 10'. The construction and operation of this pump is also known per se and therefore will not be described herein. The grooves in accordance with the present invention are disposed in this embodiment again either at the circumference of the gear wheels 22 and/or 23, or they may also be arranged as grooves 24 in the housing parts disposed opposite the ends faces of the gear wheels whereby the width of the grooves 24 decreases in a continuous manner from the pressure space. It is important in that connection that these grooves 24 are so arranged that the tooth roots or dedenda 25 pass within the area of the grooves 24. Only then can a completely satisfactory filling of the tooth gaps be assured.

While I have shown and described two embodiments in accordance with the present invention, it is understood that the same is not limited thereto but is susceptible of numerous changes and modifications within the spirit and scope thereof and I therefore do not wish to be limited to the details shown and described herein but intend to cover all such changes and modifications as are encompassed by the scope of the appended claims.

I claim:

1. A gear pump, especially for use as a pressure producer in automatically shifted change-speed gears for motor vehicles having a housing means including an inlet, an outlet, and a pumping chamber, comprising:
   an externally toothed gear wheel rotatably mounted eccentrically of said pumping chamber and an internally toothed gear wheel surrounding said externally toothed gear wheel with a portion thereof intermeshed therewith and a portion thereof spaced therefrom,
   a relatively fixed crescent portion disposed between said spaced portions of said two gear wheels,
   pressure space means between said two gear wheels adjacent one end of said fixed crescent portion associated with the outlet of said pump,
   and equalization channel means extending between said pressure space means and the tooth gaps in the externally toothed gear wheel spaced from and moving in the direction toward said pressure space means, which tooth gaps are otherwise closed to said pressure space means by said fixed crescent portions,
   the equalization channel means being in the form of a groove arranged on the inside surface of said fixed crescent portion facing and in communication only with said pressure space means and said externally toothed gear wheel,
   the equalization channel means being in constant communication over the entire length thereof with the tooth gaps passing the same and having a constantly decreasing depth starting from the pressure space means and going in a direction opposite the normal direction of rotation of said gear wheels for a distance at least greater than the width of a tooth gap.

2. A gear pump, especially for use as a pressure producer in automatically shifted change-speed gears for motor vehicles having a housing means including an inlet, an outlet, and a pumping chamber, comprising:
   an externally toothed gear wheel rotatably mounted eccentrically of said pumping chamber and an internally toothed gear wheel surrounding said externally toothed gear wheel with a portion thereof intermeshed therewith and a portion thereof spaced therefrom,
   a relatively fixed crescent portion disposed between said two gear wheels,
   pressure space means between said two gear wheels adjacent one end of said fixed crescent portion associated with the outlet of said pump,
   and equalization channel means extending between said pressure space means and the tooth gaps in the externally toothed gear wheel and in the internally toothed gear wheel spaced from and moving in the direction toward said pressure space means, which tooth gaps are otherwise closed to said pressure space means by said fixed crescent portion,
   the equalization channel means being in the form of a groove arranged on the inside surface of said fixed crescent portion facing and in communication only with said pressure space means and said externally toothed gear wheel and on the outside surface of said fixed crescent portion facing and in communication only with said pressure space means and said internally toothed gear wheel,
   the equalization channel means being in constant communication over the entire length thereof with the tooth gaps passing the same and having a constantly decreasing in depth starting from the pressure space means and going in a direction opposite the normal direction of rotation of said gear wheels for a distance at last greater than the width of a tooth gap.

References Cited by the Examiner

UNITED STATES PATENTS

| | | | |
|---|---|---|---|
| 2,124,140 | 7/38 | Foster et al. | 103—126 |
| 2,349,022 | 5/44 | Ungar et al. | 103—126 |
| 2,424,750 | 7/47 | Heckert | 103—126 |
| 2,774,309 | 12/56 | Stoyke et al. | 103—126 |
| 2,781,730 | 2/57 | Newmier | 103—126 |
| 2,865,302 | 12/58 | Murray | 103—126 |
| 2,887,064 | 5/59 | Say | 103—126 |
| 2,891,483 | 6/59 | Murray et al. | 103—126 |
| 2,966,118 | 12/60 | McAlvay | 103—126 |
| 2,983,228 | 5/61 | Wagner et al. | 103—126 |

FOREIGN PATENTS

| | | |
|---|---|---|
| 720,949 | 12/31 | France. |
| 1,138,129 | 1/57 | France. |
| 157,744 | 12/32 | Switzerland. |

KARL J. ALBRECHT, *Primary Examiner.*

WILBUR J. GOODLIN, JOSEPH H. BRANSON, JR.,
*Examiners.*